(12) United States Patent
Friedrich et al.

(10) Patent No.: US 10,683,885 B2
(45) Date of Patent: Jun. 16, 2020

(54) DUAL PURPOSE THREADED INSERT/COMPRESSION LIMITER

(71) Applicant: GM Global Technology Operations LLC, Detroit, MI (US)

(72) Inventors: Marc L. Friedrich, Rochester Hills, MI (US); Martin K. Scott, Waterford, MI (US); Kevin W. Herrala, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 15/654,675

(22) Filed: Jul. 19, 2017

(65) Prior Publication Data
US 2019/0024696 A1 Jan. 24, 2019

(51) Int. Cl.
| | |
|---|---|
| *F16B 43/02* | (2006.01) |
| *F16B 21/18* | (2006.01) |
| *F02F 7/00* | (2006.01) |
| *F16B 19/02* | (2006.01) |
| *F16B 39/30* | (2006.01) |
| *F16B 41/00* | (2006.01) |
| *F16B 33/00* | (2006.01) |
| *F02B 77/08* | (2006.01) |
| *F16B 5/02* | (2006.01) |
| *F16B 31/02* | (2006.01) |

(52) U.S. Cl.
CPC ............ *F16B 21/183* (2013.01); *F02F 7/006* (2013.01); *F16B 19/02* (2013.01); *F16B 39/30* (2013.01); *F02B 77/088* (2013.01); *F02F 2007/0041* (2013.01); *F16B 5/025* (2013.01); *F16B 31/021* (2013.01); *F16B 33/004* (2013.01); *F16B 41/002* (2013.01)

(58) Field of Classification Search
CPC ...................................... F16B 21/183
USPC ....................... 411/546; 123/195 C
See application file for complete search history.

(56) References Cited

U.S. PATENT DOCUMENTS

| | | | | |
|---|---|---|---|---|
| 7,708,512 B2 * | 5/2010 | McLean | ................ | F16B 41/002 411/533 |
| 9,540,997 B2 * | 1/2017 | Lohr | ....................... | F02B 77/02 |
| 2006/0065222 A1 * | 3/2006 | Neal | ....................... | F02B 77/00 123/90.38 |

* cited by examiner

*Primary Examiner* — Gary W Estremsky
(74) *Attorney, Agent, or Firm* — Harness, Dickey & Pierce, P.L.C.

(57) ABSTRACT

A cover member includes a body member made of a composite material and including a mounting flange. A plurality of compression limiters are disposed in the mounting flange, the compression limiters have a predetermined thickness and an internally threaded aperture therein. The dual function compression limiters eliminate the need for separate threaded inserts. With the dual function compression limiter, every bolt location provides a potential location for a jack screw.

12 Claims, 3 Drawing Sheets

DUAL PURPOSE THREADED INSERT/COMPRESSION LIMITER

FIELD

The present disclosure relates to a compression limiter for a composite cover that includes internal threads for receiving a jack screw to assist in removing the cover.

BACKGROUND

This section provides background information related to the present disclosure which is not necessarily prior art.

Current composite pan/cover assemblies 110 have metallic compression limiters 112 at each bolt hole 114 for receiving a mounting bolt 116, as shown in FIG. 4. The pan/cover assemblies 110 also include a metallic threaded insert 116 used with a jack screw 118 to help break the sealant bond and separate the pan/cover assembly 110, as shown in FIG. 5.

SUMMARY

This section provides a general summary of the disclosure, and is not a comprehensive disclosure of its full scope or all of its features.

A cover member includes a body member made of a composite material and including a mounting flange. A plurality of compression limiters are disposed in the mounting flange, the compression limiters have a predetermined thickness and an internally threaded aperture therein. The dual function compression limiters eliminate the need for separate threaded inserts. With the present disclosure, every bolt location provides a potential location for a jack screw.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
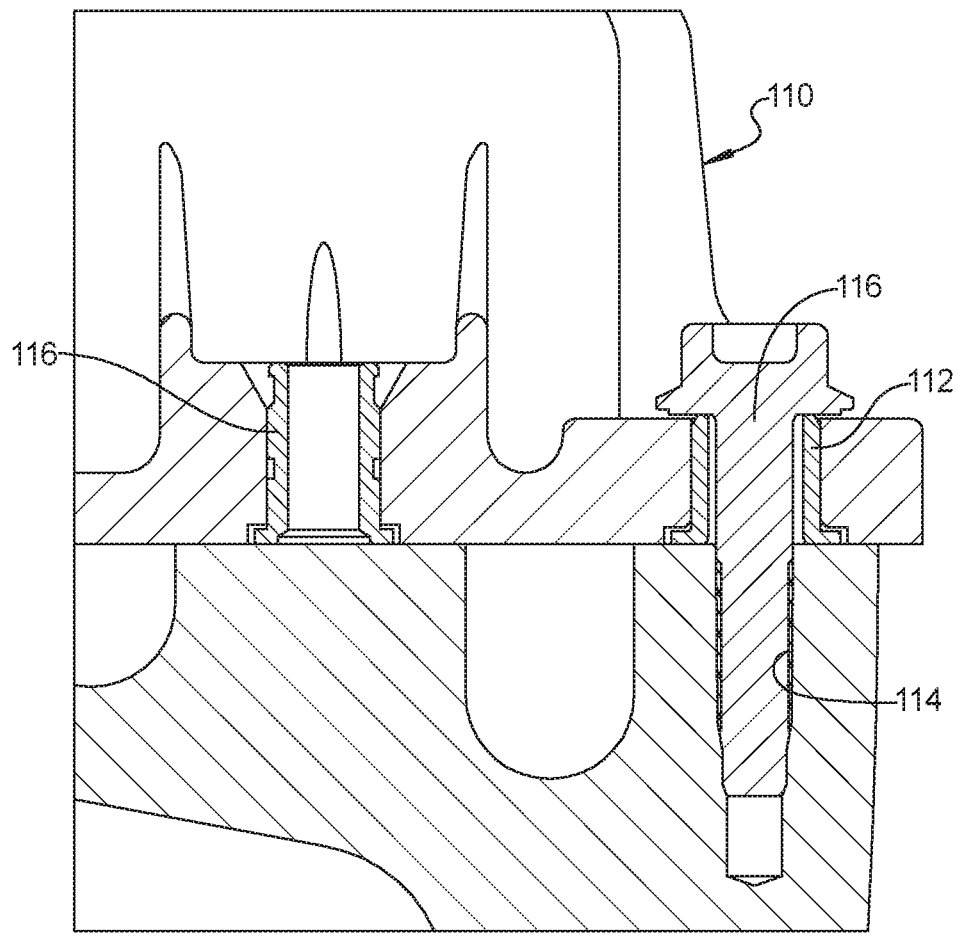
Figure 5:
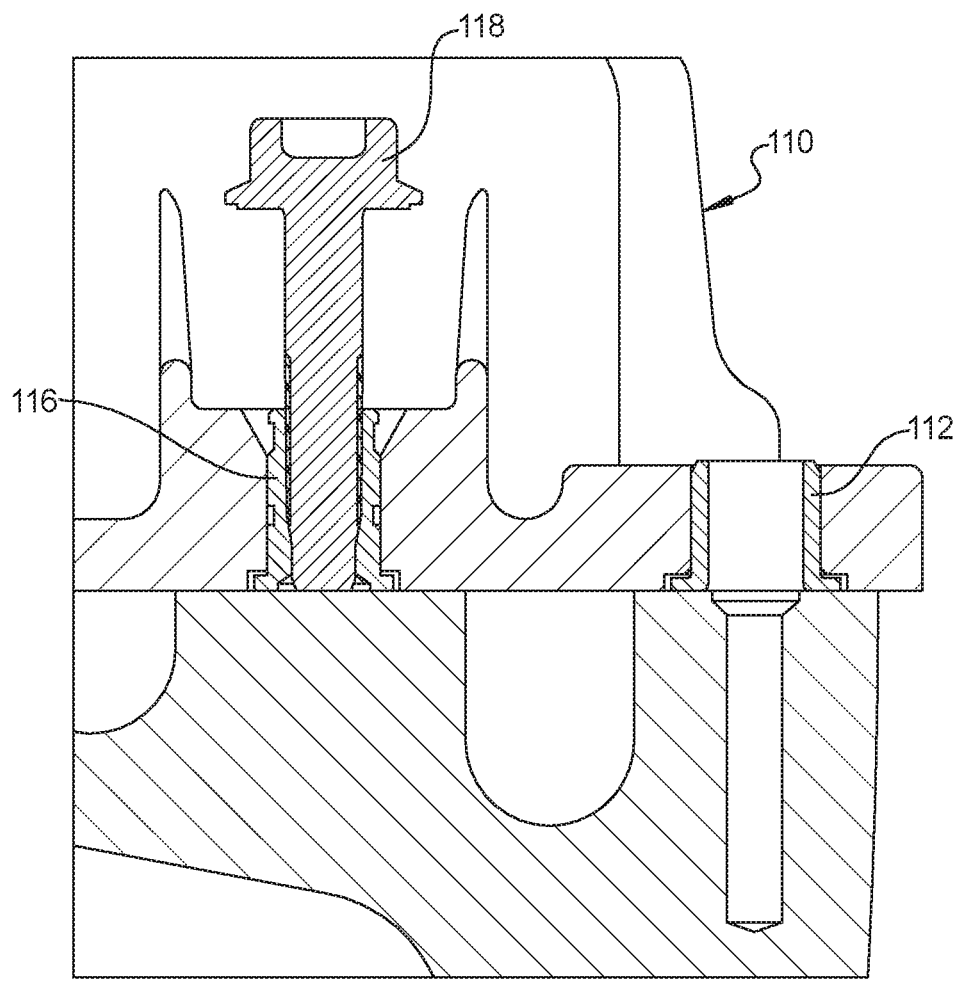

FIG. 4 is a cross-sectional view of an engine with a conventional composite cover and a compression limiter and separate jack screw insert with a mounting screw inserted through the compression limiter; and FIG. 5 is a cross-sectional view of an engine with the conventional composite cover and a compression limiter and separate jack screw insert receiving a jack screw for removing the composite cover.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
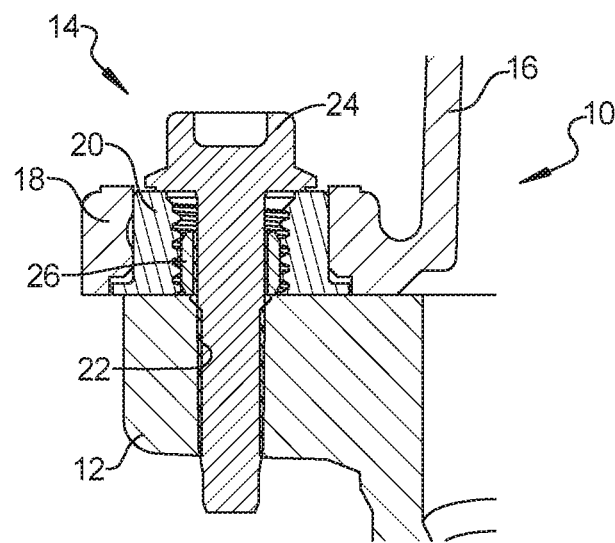
FIG. 1 is a cross-sectional view of an engine with a composite cover and a compression limiter/jack screw insert receiving a mounting screw according to the principles of the present disclosure.
Figure 2:
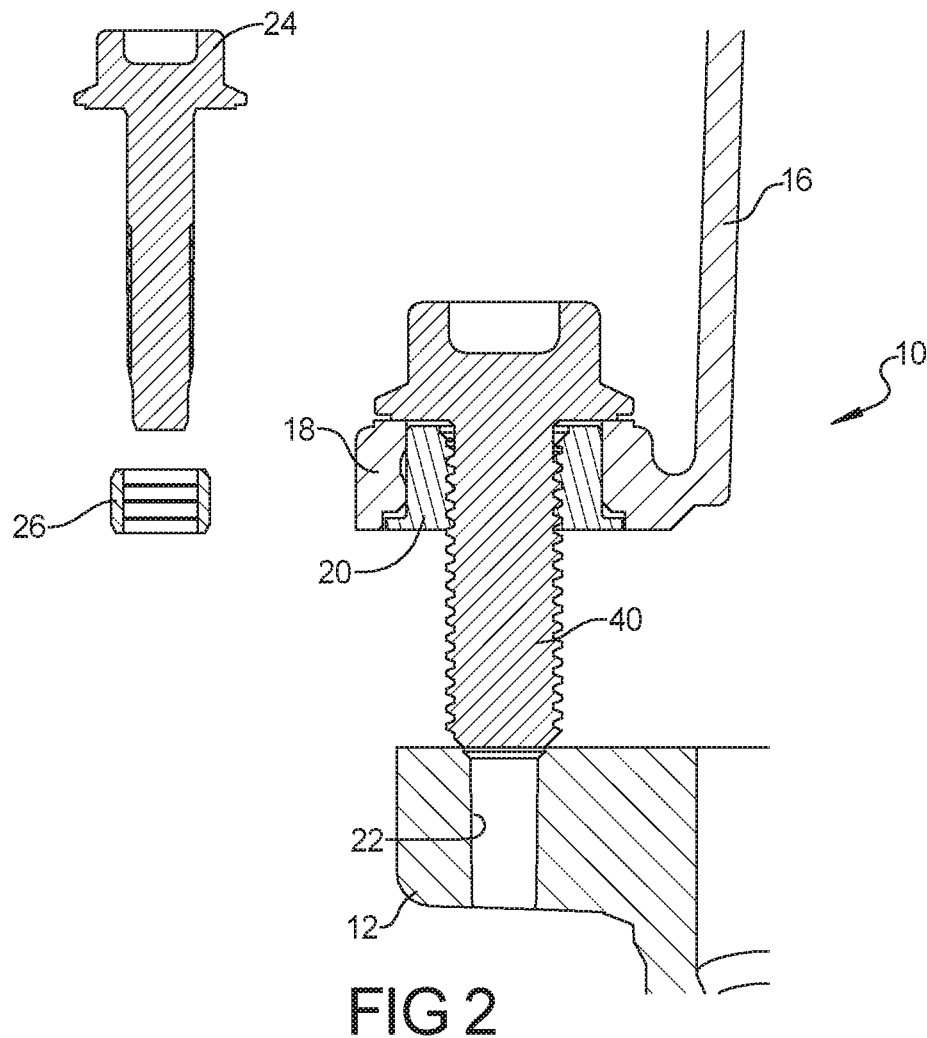
FIG. 2 is a cross-sectional view of an engine with a composite cover and a compression limiter/jack screw insert receiving a jack screw according to the principles of the present disclosure.

With reference to FIGS. 1 and 2, an engine assembly 10 is shown including an engine structure 12 and a pan/cover assembly 14. The pan/cover assembly includes a composite body 16 having a mounting flange 18. A plurality of compression limiters 20 are mounted within the mounting flange 18 and in alignment with threaded mounting holes 22 in the engine structure 12. As shown in FIG. 1, mounting screw 24 is inserted through the compression limiter 20 and into the threaded mounting hole 22 for securing the pan/cover assembly 14 to the engine structure 12. A screw retainer 26, as is known in the art, can optionally be disposed within the compression limiter 20 and is capable of securing the mounting bolt 24 within the compression limiter 20 prior to assembly of the pan/cover assembly 10 to the engine structure 12.

Figure 3:
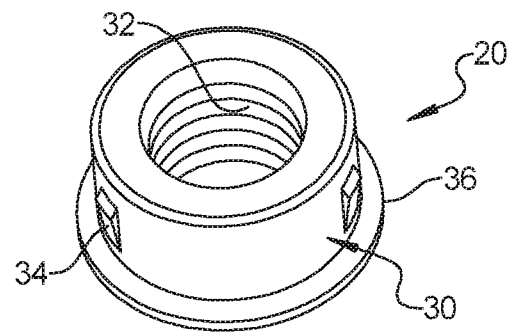
FIG. 3 is a perspective view of a compression limiter/jack screw insert according to the principles of the present disclosure.

The compression limiter 20 as shown in FIG. 3, includes a body 30 which can be made from a metallic material and has a predetermined thickness with an internally threaded aperture 32. The body 30 can include a polygonal exterior surface 34 with a plurality of flat surfaces and a radially outwardly extending flange portion 36. The compression limiter 20 can be press fit, bonded, overmolded or otherwise retained within a corresponding aperture in the mounting flange 18. The mounting bolt 24 has a bolt diameter that is smaller than an internal diameter of the internally threaded aperture 32 of the compression limiter 20.

As shown in FIG. 2, the mounting bolt 24 and optional screw retainer 26 can be removed from the threaded mounting hole 22 and compression limiter 20. A larger diameter jackscrew 40 can then be threadedly inserted into the internally threaded aperture 32 of the compression limiter 20 so that an end of the jackscrew 40 engages a surface of the engine structure 12 surrounding the threaded mounting hole 22 and causes a lifting of the compression limiter 20 and pan/cover assembly 14 away from the engine structure 12 in order to break the sealant bond between the pan/cover assembly 14 and engine structure 12.

The dual purpose threaded compression limiter 20 combines multiple functions into one component to be used in composite oil pan and cover assemblies. The compression limiter 20 improves serviceability of parts by allowing multiple pry points and reduces cost by eliminating separate threaded inserts. The compression limiters 20 improve component packaging around the sealing perimeter and of the boss around the engine structure. Although the dual purpose compression limiters 20 of the present disclosure have been disclosed in association with an engine assembly 10, it should be understood that the compression limiters 20 can be utilized on various oil pans and covers in engines, transmissions and other industrial machinery in which a composite material is utilized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine, comprising:
    an engine structure having a plurality of threaded bolt holes therein;
    a cover mounted to the engine structure and made from a composite material, the cover including a flange portion having a plurality of compression limiters disposed therein, the compression limiters having an internal thread having a internal diameter larger than the threaded bolt holes in the engine structure; and
    a plurality of mounting bolts extending through the compression limiters and threaddedly engaged with the threaded bolt holes in the engine structure.

2. The internal combustion engine according to claim 1, further comprising bolt retainers received within the compression limiters between the mounting bolts and the compression limiters.

3. The internal combustion engine according to claim 1, wherein the cover is an oil pan.

4. The internal combustion engine according to claim 1, wherein the plurality of compression limiters are made from metal.

5. The internal combustion engine according to claim 1, wherein the plurality of compression limiters include a radially extending flange.

6. The internal combustion engine according to claim 1, wherein the plurality of compression limiters have a polygonal outer surface.

7. The internal combustion engine according to claim 1, further comprising a jack screw having a larger diameter than the plurality of mounting bolts and being threadedly received in the compression limiters for prying the cover away from the engine structure.

8. A method of removing a composite cover from an internal combustion engine including an engine structure having a plurality of threaded bolt holes, and a composite cover including a flange portion connected to the engine structure by a sealant and having a plurality of compression limiters disposed therein, the compression limiters having an internal thread having a pitch diameter larger than the threaded bolt holes, a plurality of mounting bolts extending through the compression limiters and threadably engaged with the threaded bolt holes in the engine structure, the method comprising:
    removing the mounting bolts from the threaded bolt holes in the engine structure and threadably inserting a plurality of bolts into the internal thread of the compression limiters and against the engine structure surrounding the plurality of bolt holes to apply a separating force to the cover to overcome the sealant connection of the flange.

9. A cover member, comprising:
    a body member made of a composite material and including a mounting flange;
    a plurality of compression limiters made of metal and disposed in the mounting flange, the compression limiter having a predetermined thickness and an internally threaded aperture therein;
    a plurality of mounting bolts received in the compression limiters; and
    a plurality of annular bolt retainers removably received within the compression limiters between the mounting bolts and the compression limiters.

10. The cover member according to claim 9, wherein the cover is an oil pan.

11. The cover member according to claim 9, wherein the plurality of compression limiters include a radially extending flange.

12. The cover member according to claim 9, wherein the plurality of compression limiters have a polygonal outer surface.

* * * * *